(12) United States Patent
Jorgensen et al.

(10) Patent No.: US 8,881,887 B2
(45) Date of Patent: Nov. 11, 2014

(54) FOLDABLE CONVEYOR

(75) Inventors: John E. Jorgensen, Andover, MN (US);
Michael E. Stevens, Saint Paul, MN (US)

(73) Assignee: Caterpillar Inc., Peoria, IL (US)

( * ) Notice: Subject to any disclaimer, the term of this patent is extended or adjusted under 35 U.S.C. 154(b) by 215 days.

(21) Appl. No.: 13/517,761

(22) Filed: Jun. 14, 2012

(65) Prior Publication Data

US 2013/0334864 A1    Dec. 19, 2013

(51) Int. Cl.
*B65G 17/28*    (2006.01)
*B65G 21/14*    (2006.01)
*B65G 21/10*    (2006.01)

(52) U.S. Cl.
CPC ............... *B65G 21/14* (2013.01); *B65G 21/10* (2013.01)
USPC .......................................... 198/313; 198/581

(58) Field of Classification Search
CPC ...... B65G 21/14; B65G 21/10; B65G 41/005; B65G 67/08; B65G 13/12
USPC .................................................. 198/313, 581
See application file for complete search history.

(56) References Cited

U.S. PATENT DOCUMENTS

| | | | | |
|---|---|---|---|---|
| 2,812,867 | A | * | 11/1957 | Anderson ...................... 198/581 |
| 3,362,460 | A | * | 1/1968 | Ligh .............................. 160/188 |
| 3,599,784 | A | * | 8/1971 | Rossi ............................ 198/313 |
| 4,591,432 | A | | 5/1986 | Hartl |
| 5,086,911 | A | | 2/1992 | Douglas |
| 5,443,351 | A | * | 8/1995 | Pettijohn ....................... 198/632 |
| 6,296,109 | B1 | | 10/2001 | Nohl |
| 6,910,586 | B2 | * | 6/2005 | McCloskey ................... 198/313 |
| 7,347,311 | B2 | | 3/2008 | Rudge |
| 8,404,666 | B2 | * | 3/2013 | DeLuca et al. ................ 514/167 |
| 2009/0267402 | A1 | | 10/2009 | Berning et al. |

* cited by examiner

*Primary Examiner* — James R Bidwell
(74) *Attorney, Agent, or Firm* — Miller, Matthias & Hull

(57) ABSTRACT

A foldable conveyor having a first conveyor section and a second conveyor section pivotally connected to the first conveyor section. The pivotal connection allows the second conveyor section to articulate about the first conveyor section. The foldable conveyor also includes a pivoting mechanism operatively connected to the first conveyor section and the second conveyor section. The pivoting mechanism includes a first link having one end pivotally connected to the first section. The pivoting mechanism also includes a second link having one end pivotally connected to the second section. A second end of the second link is pivotally connected with a second end of the first link. The pivoting mechanism further includes an actuator configured to pivot the second conveyor section about the first conveyor section by allowing a relative movement between the first link and the second link.

14 Claims, 3 Drawing Sheets

FOLDABLE CONVEYOR

TECHNICAL FIELD

The present disclosure relates to a foldable conveyor, and more particularly, to a pivoting mechanism for the foldable conveyor.

BACKGROUND

One type of road construction vehicle, commonly referred to as a cold planer machine, generally includes a machine frame and a cutting drum rotatably mounted on the machine frame. The cutting drum facilitates in removing asphalt from a roadbed. The machine also includes a conveyor used for transporting the asphalt to a discharge location such as a truck bed of a dump truck. Typically, the conveyor includes a first conveyor section attached to the main frame and a second conveyor section pivotally connected to the first conveyor section. The conveyor is adapted to be folded for allowing the machine to be transported between job sites. The conveyor is folded by pivotally moving the second conveyor section with respect to the first conveyor section, such that, the second conveyor section is positioned beneath the first conveyor section.

U.S. Patent Publication 20090267402 discloses a folding transport conveyor for a construction machine. The folding transport conveyor includes a first transport conveyor section articulated at the construction machine, and a second transport conveyor section articulated at the first transport conveyor section in a pivoting fashion. The folding transport conveyor also includes a conveyor belt continuously revolving around both transport conveyor sections, and with at least one pivoting mechanism acting between the transport conveyor sections. The pivoting mechanism includes a cam mechanism.

SUMMARY OF THE DISCLOSURE

In one aspect, the present disclosure provides a foldable conveyor having a first conveyor section and a second conveyor section pivotally connected to the first conveyor section. A pivotal connection allows the second conveyor section to articulate about the first conveyor section. The foldable conveyor also includes a pivoting mechanism operatively connected to the first conveyor section and the second conveyor section. The pivoting mechanism includes a first link having a first end pivotally connected to the first conveyor section. The pivoting mechanism also includes a second link having a first end pivotally connected to the second conveyor section. A second end of the second link is pivotally connected with a second end of the first link. The pivoting mechanism further includes an actuator configured to pivot the second conveyor section about the first conveyor section by allowing a relative movement between the first link and the second link.

In another aspect, the present disclosure provides machine a frame, an implement supported on the frame, and a foldable conveyor. The foldable conveyor includes a first conveyor section operatively connected to the frame; and a second conveyor section pivotally connected to the first conveyor section. A pivotal connection allows the second conveyor section to articulate about the first conveyor section. The foldable conveyor also includes a pivoting mechanism operatively connected to the first conveyor section and the second conveyor section. The pivoting mechanism includes a first link having a first end pivotally connected to the first conveyor section and a second link having a first end pivotally connected to the second conveyor section. A second end of the second link is pivotally connected with a second end of the first link. The pivoting mechanism also includes an actuator configured to pivot the second conveyor section about the first conveyor section by allowing a relative movement between the first link and the second link.

Other features and aspects of this disclosure will be apparent from the following description and the accompanying drawings.

DETAILED DESCRIPTION

Figure 1:
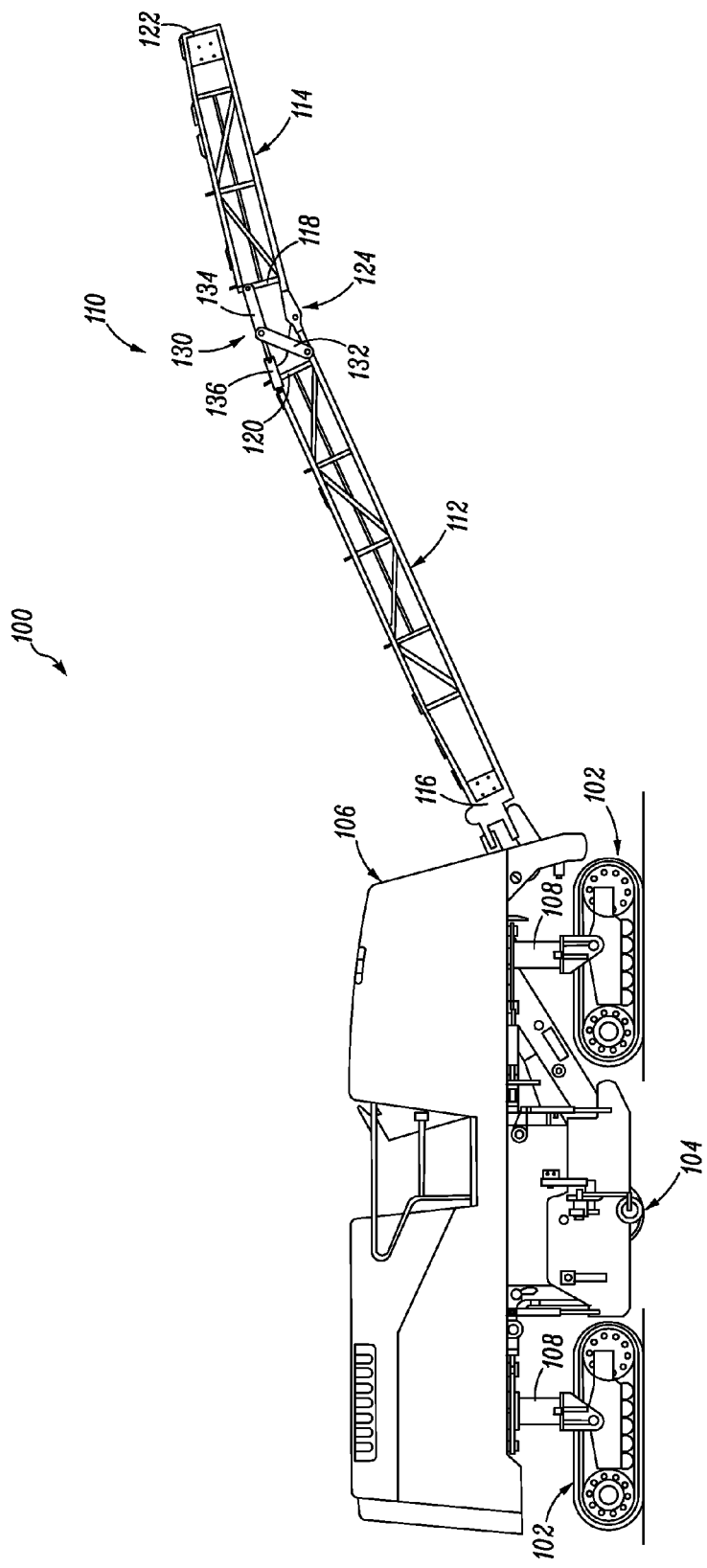
FIG. 1 illustrates a side view of an exemplary machine having a foldable conveyor, according to one embodiment of the present disclosure.

The present disclosure will now be described in detail with reference being made to accompanying figures. An exemplary machine 100 in which disclosed embodiments may be implemented is schematically illustrated in FIG. 1. In the accompanied drawings, the machine 100 is illustrated as a cold planer machine. The machine 100 may be used in art of construction.

The machine 100 includes a plurality of drive tracks 102 configured for propelling the machine 100 along a road surface. The machine 100 also includes an implement 104, such as a cutting drum, supported on the frame. The implement 104 facilitates in milling the road surface. A cutting plane of the machine 100 is tangent to the bottom of the implement 104 and parallel to the direction of travel of the machine 100. The drive tracks 102 of the machine 100 are connected to a frame 106 of the machine 100 by hydraulic legs 108. The hydraulic legs 108 are configured to raise and lower the implement 104 relative to the drive tracks 102 so as to control a depth of cut for the implement 104.

The machine 100 is further equipped with a foldable conveyor 110 configured to transport excavated asphalt from the implement 104 to a discharge location such as the bed of a dump truck. For example, the foldable conveyor 110 may be equipped with a conveyor belt (not shown) rotating around the foldable conveyor 110 that facilitates in transporting excavated asphalt to the discharged location.

The foldable conveyor 110 includes a first conveyor section 112 and a second conveyor section 114. The first conveyor section 112 and the second conveyor section 114 include proximal ends 116, 118 and distal ends 120, 122, respectively. The proximal end 116 of the first conveyor section 112 is operatively connected to the frame 106 of the machine 100, such that, the first conveyor section 112 may be articulated about the frame 106. The distal end 120 of the first conveyor section 112 is pivotally connected to the proximal end 118 of the second conveyor section 114. For example, a pivotal connection 124 between the first conveyor section 112 and the second conveyor section 114 allows the second conveyor section 114 to articulate about the first conveyor section 112.

The foldable conveyor 110 also includes a pivoting mechanism 130 operatively connected to the first conveyor section 112 and the second conveyor section 114. The pivoting mechanism 130 facilitates the foldable conveyor 110 to attain one of a deployed state (when the foldable conveyor 110 is in use) and a folded state (when the foldable conveyor 110 is not in use). As shown in FIG. 1, the foldable conveyor 110 is in the deployed state, in which, the first conveyor section 112 and the second conveyor section 114 are positioned in a substantially linear state. The folded state of the foldable conveyor 110 will be explained in detail later herein.

The pivoting mechanism 130 includes a first link 132, a second link 134, and an actuator 136. The pivoting mechanism 130 is laterally positioned and operatively connected to a first side of the first conveyor section 112 and the second conveyor section 114. The foldable conveyor 110 also includes another pivoting mechanism (not shown), such as the pivoting mechanism 130, laterally positioned and operatively connected to a second side of the first conveyor section 112 and the second conveyor section 114.

The first link 132 includes a first end pivotally connected to the first conveyor section 112. The second link 134 includes a first end pivotally connected to the second conveyor section 114. A second end of the second link 134 is pivotally connected with a second end of the first link 132. The actuator 136 is configured to pivot the second conveyor section 114 about the first conveyor section 112 by allowing a relative movement between the first link 132 and the second link 134.

Figure 2:
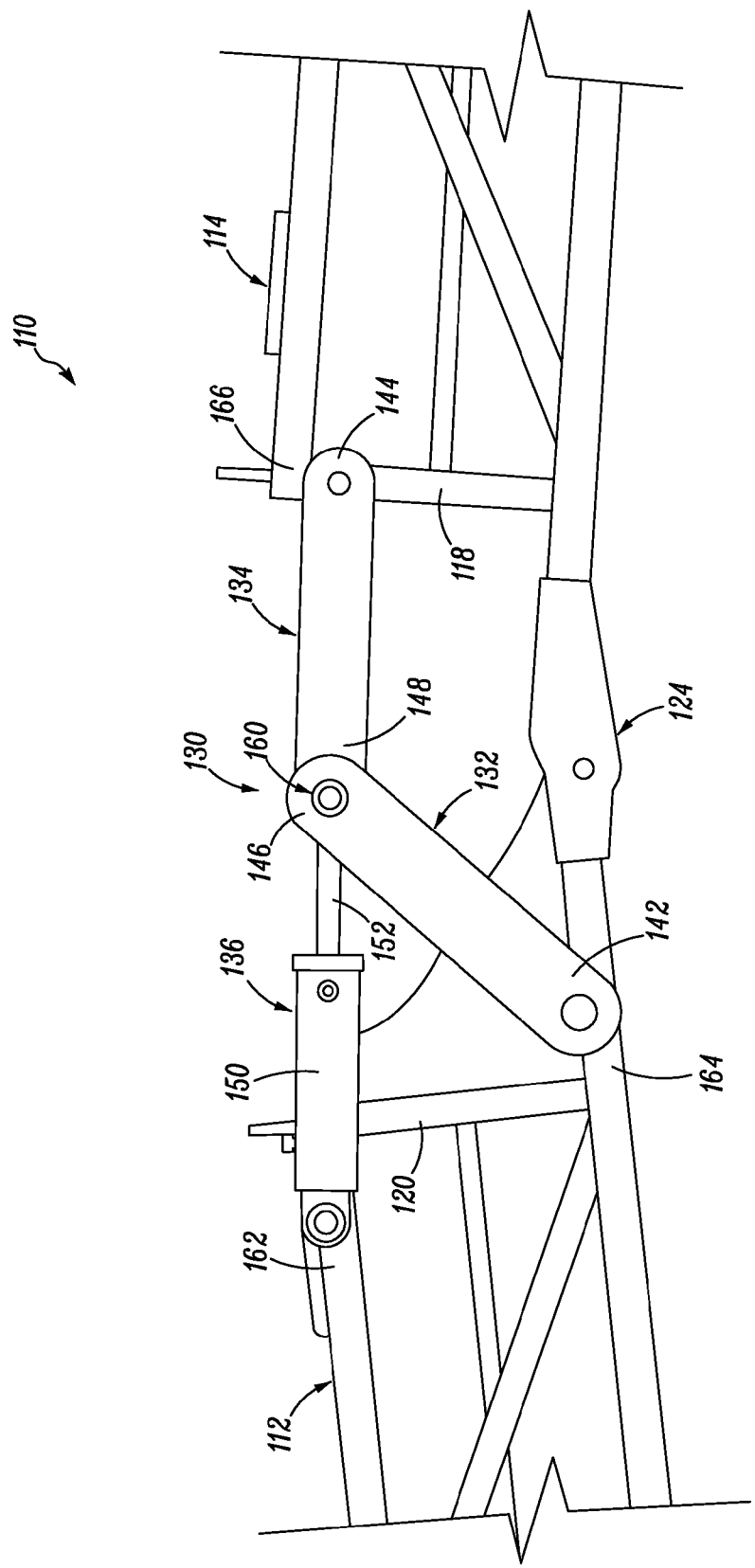
FIG. 2 illustrates an enlarged view of a portion of the foldable conveyor in a deployed state.

Referring now to FIG. 2, the first link 132, the second link 134, and the actuator 136 are pivotally connected to the first conveyor section 112 and the second conveyor section 114. For example, a first end 142 of the first link 132 is pivotally connected to the distal end 120 of the first conveyor section 112, and a first end 144 of the second link 134 is pivotally connected to the proximal end 118 of the second conveyor section 114. Further, a second end 146 of the first link 132 is pivotally connected to a second end 148 of the second link 134.

In the present embodiment, the actuator 136 is a hydraulic actuator having a hydraulic cylinder 150 and a rod 152 assembly. However, it may be evident to those skilled in the art that, the actuator 136 may be an electrical actuator. For example, the actuator 136 may be a motor having means adapted to translate a rotary motion of the motor into a linear motion that is capable of actuating the first link 132 and the second link 134.

The hydraulic cylinder 150 is pivotally connected to the distal end 120 of the first conveyor section 112. The rod 152 is pivotally connected the second ends 146, 148 of the first link 132 and the second link 134, respectively. This defines a common pivot point 160 for the first link 132, the second link 134, and the actuator 136. The common pivot point 160 provides another pivotal connection, such as the pivotal connection 124, between the first conveyor section 112 and the second conveyor section 114. It is to be understood that, the term "pivotally connected" used herein also considers pivot pins that provide the pivotal connection for the first link 132, the second link 134, and the actuator 136.

As shown in FIG. 2, the hydraulic cylinder 150 of the actuator 136 is pivotally connected to an upper portion 162 of the distal end 120 of the first conveyor section 112, whereas the first end 142 of the first link 132 is pivotally connected to a lower portion 164 of the distal end 120 of the first conveyor section 112. Also, the pivotal connections of the hydraulic cylinder 150 and the first end 142 of the first link 132 do not share a vertical axis. For example, the first end 142 of the first link 132 is horizontally away from a vertical axis, passing through the pivotal connection of the hydraulic cylinder 150 to the first conveyor section 112.

The first end 144 of the second link 134 is pivotally connected to an upper potion 166 of the proximal end 118 of the second conveyor section 114. However, the pivotal connection of the first end 144 of the second link 134 is positioned at a lower height as compared to a height of the pivotal connection of the hydraulic cylinder 150 with the first conveyor section 112. It is to be understood, the reference of the pivotal connections for the first link 132, the second link 134, and the actuator 136 is explained herein in conjunction with the deployed state, of the foldable conveyor 110, i.e., when the first conveyor section 112 and the second conveyor section 114 are positioned in the substantially linear state.

In operation, the actuator 136 is configured to pivot the second conveyor section 114 about the first conveyor section 112 by allowing a relative movement between the first link 132 and the second link 134. As explained herein, the actuator 136 is the hydraulic actuator therefore the actuator 136 may be hydraulically operated with the help of a hydraulic pump (not shown) and hydraulic lines (not shown) coupling the actuator 136 with the hydraulic pump. The hydraulic cylinder 150 of the actuator 136 may be connected with the hydraulic lines, and the hydraulic pump may vary pressure within the hydraulic cylinder 150 by regulating flow of fluid through the hydraulic lines. This allows the rod 152 to move within the hydraulic cylinder 150. For example, the rod 152 may extend or retract from and within the hydraulic cylinder 150 with the regulation of the flow of the fluid through the hydraulic lines.

Figure 3:
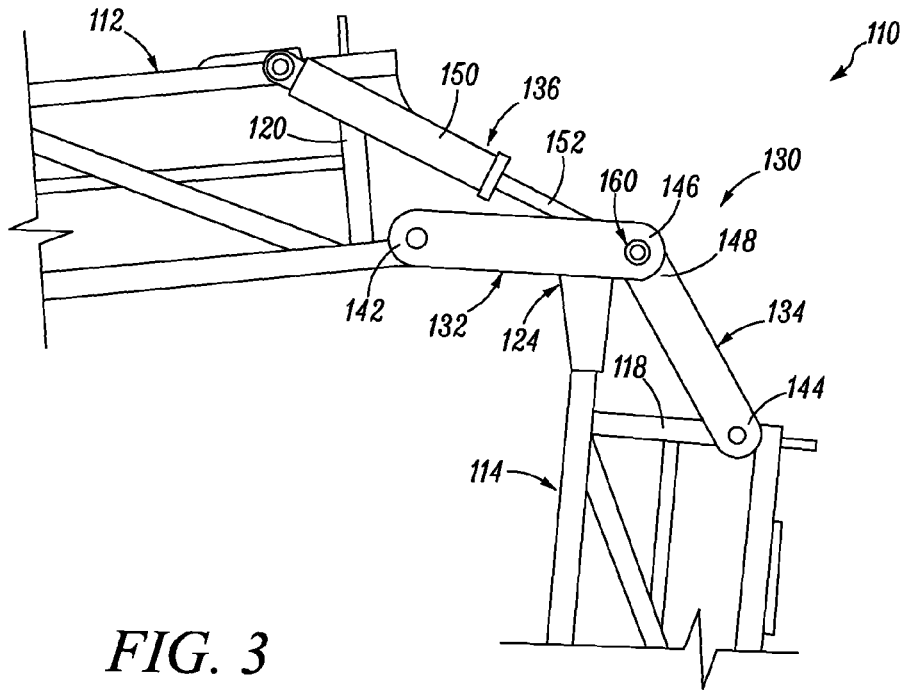
FIG. 3 illustrates the portion of the foldable conveyor in an intermediate state.

The extension and refraction of the rod 152 moves the common pivot point 160 thereby providing relative movement between the first link 132 and the second link 134 to pivot the second conveyor section 114 about the first conveyor section 112. Referring now to FIG. 3, the foldable conveyor 110 is shown in an intermediate state, a state between the deployed state and the folded state. The intermediate state may be considered as a deployed state depending on the use of the foldable conveyor 110.

As shown in FIG. 3, the rod 152 partially extends outside the hydraulic cylinder 150 causing the common pivot point 160 to move downward. The extension of the rod 152 causes the actuator 136 to pivot clockwise about the hydraulic cylinder 150. The pivotal movement of the actuator 136 is provided by the first link 132. Specifically, a linear extension of the rod 152 is restricted by the second end 146 of the first link 132. Therefore, the first link 132 tends to pivot clockwise with the extension of the rod 152 which in turn pivots the actuator 136 clockwise.

Further, the extension of the rod 152 pushes the second link 134 and causes the second conveyor section 114 to pivot clockwise about the pivotal connection 124. Specifically, the extension of the rod 152 tends to linearly push the second end 148 of the second link 134; however the second end 146 of the first link 132 restricts the linear movement of the second end 148 of the second link 134 causing the second end 148 of the second link 134 to move downward. The downward movement of the second end 148 of the second link 134 causes the first end 144 of the second link 134 to push the proximal end 118 of the second conveyor section 114. Upon pushing the proximal end 118, the second conveyor section 114 pivots clockwise about the pivotal connection 124.

It may be evident to those skilled in the art that, a weight of the second conveyor section 114 may also assist in providing the clockwise pivotal movement to the second conveyor section 114. However, the second conveyor section 114 may be allowed to attain a desired/specific position based on the operation of the actuator 136.

Figure 4:
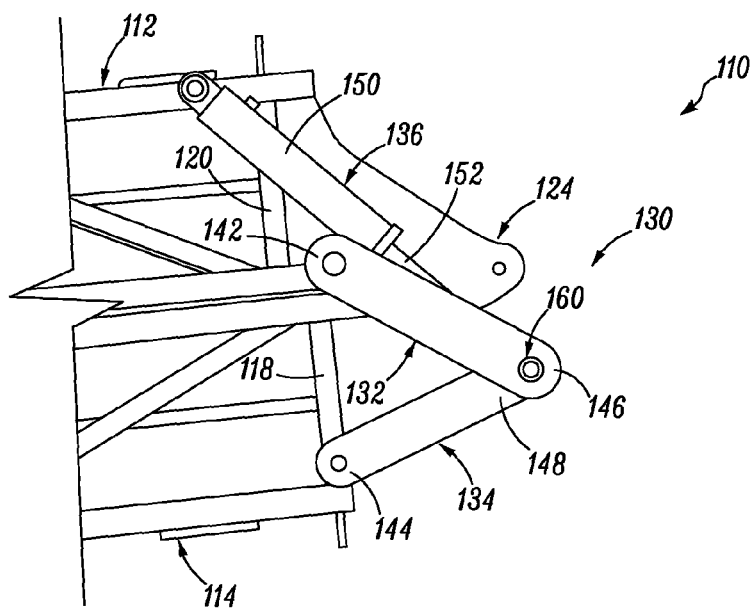
FIG. 4 illustrates the portion of the foldable conveyor in a folded state.

Referring now to FIG. 4, the foldable conveyor 110 is shown in the folded state. The rod 152 completely extends from the hydraulic cylinder 150 causing the common pivot point 160 to move further downward. It is to be understood that in the complete extended state of the rod 152, a portion of the rod 152 still positioned inside and engages with the hydraulic cylinder 150. Specifically, the complete extension of the rod 152 with the restriction provided by the first link 132 causes the first link 132 and the actuator 136 to further pivot clockwise about the distal end 120 of the first conveyor section 112.

The further pivotal clockwise movement of the first link 132 and the actuator 136 allows the second link 134 to further push the proximal end 118 of the second conveyor section 114. Specifically, the second end 148 of the second link 134 along with the common pivot point 160 further move downward causing the first end 144 of the second link 134 to further push the proximal end 118 of the second conveyor section 114. This pivots the second conveyor section 114 until the second conveyor section 114 is positioned underneath the first conveyor section 112. Upon attaining the folded state, the first end 144 of the second link 134 pivots about the proximal end 118 of the second conveyor section 114. In the folded state, the second conveyor section 114 is retained underneath the first conveyor section 112 by the actuator 136.

The foldable conveyor 110 may be further allowed to attain the deployed state (shown in FIG. 1) from the folded state with the help of the pivoting mechanism 130. Specifically, the rod 152 may be retracted inside the hydraulic cylinder 150 causing the common pivot point 160 to move upward. The retraction of the rod 152 may cause the actuator 136 to pivot counter-clockwise about the hydraulic cylinder 150. For example, a linear retraction of the rod 152 may be restricted by the second end 146 of the first link 132. Therefore, the first link 132 may tend to pivot counter-clockwise about the first end 142 which in turn may pivot the actuator 136 counter-clockwise. The retraction of the rod 152 may pull the second link 134 and may cause the second conveyor section 114 to pivot counter-clockwise about the pivotal connection 124.

The retraction of the rod 152 may tend to linearly pull the second end 148 of the second link 134; however the second end 146 of the first link 132 may restrict the linear movement of the second end 148 of the second link 134 that may cause the second end 148 of the second link 134 to move upward. The upward movement of the second end 148 of the second link 134 may cause the first end 144 of the second link 134 to pull the proximal end 118 of the second conveyor section 114. Upon pulling the proximal end 118 the second conveyor section 114 may pivot counter-clockwise about the pivotal connection 124.

It may be evident to those skilled in the art that, the second conveyor section 114 may be allowed to pivot counter-clockwise, as explained above, to attain the intermediate state (shown in FIG. 3) from the folded state (shown in FIG. 4). For example, the intermediate state may be attained with the partial retraction of the rod 152 within the hydraulic cylinder 150. Similarly, with the complete retraction of the rod 152 within the hydraulic cylinder 150 may allow the second conveyor section 114 to further pivot counter-clockwise and attain the deployed state (as shown in FIG. 1). In the deployed state, the second conveyor second 114 may be positioned substantially linear to the first conveyor section 112.

Industrial Applicability

The present disclosure provides the machine 100 with the foldable conveyor 110. The foldable conveyor 110 may be equipped with the conveyor belt adapted to rotate around the foldable conveyor 110 for transporting excavated asphalt to the discharged location. The machine 100 is particularly suited for application such as road construction.

During operation of the machine 100, the foldable conveyor 110 may be allowed to attain the deployed state. The pivoting mechanism 130 of the foldable conveyor 110 facilitates the foldable conveyor 110 to attain the deployed state. In the deployed state, the foldable conveyor 110 with the help of the conveyor belt facilitates in transporting the excavated asphalt to the discharge location. Once the operation of the transporting the excavated asphalt is finished the foldable conveyor 110 is allowed to attain the folded state. The pivoting mechanism 130 of the foldable conveyor 110 facilitates the foldable conveyor 110 to attain the folded state.

The folded state of the foldable conveyor 110 provides easy transportability to the machine 100. For example, the folded state allows the machine 100 to be compact and allows the machine 100 to be easily transported between construction sites. Further, in the folded state the machine 100 may be easily accommodated or stored in the construction site within a permissible space. The foldable conveyor 110 of the present disclosure is a simple and cost effective construction. For example, limited number of components, such as the first link 132, the second link 134 and the actuator 136 along with the first conveyor section 112 and the second conveyor section 114, makes it simple and cost effective construction. Further, due to the simple construction of the foldable conveyor 110, servicing of the foldable conveyor 110 becomes easy and less time consuming. Moreover, the geometry of the first link 132, the second link 132 and the actuator 136; and the placement of the pivotal connection 124, the common pivot point 160, the first end 142 of the first link 132, and the first end 144 of the second link 134 provide efficient transfer of loading from the second conveyor section 114 to the first conveyor section 112 in the deployed state.

It may be evident to those skilled in the art that, the foldable conveyor 110 of the present disclosure may have other applications apart from being used with the cold planner machine. For example, the foldable conveyor 110 may be used in conjunction with a quarry conveyor.

Although the embodiments of this disclosure as described herein may be incorporated without departing from the scope of the following claims, it will be apparent to those skilled in the art that various modifications and variations can be made. Other embodiments will be apparent to those skilled in the art from consideration of the specification and practice of the disclosure. It is intended that the specification and examples be considered as exemplary only, with a true scope being indicated by the following claims and their equivalents.

What is claimed is:

1. A foldable conveyor comprising:
a first conveyor section having an upper portion, a lower portion and a distal end;
a second conveyor section having an upper portion, a lower portion and a proximal end, the lower portion of the second conveyor section pivotally connected to the lower portion of the first conveyor section, wherein a pivotal connection between the lower portion of the distal end of the first conveyor section to the lower portion of the proximal end of the second conveyor section allows the second conveyor section to articulate about the first conveyor section;
a pivoting mechanism operatively connected to the first conveyor section and the second conveyor section, the pivoting mechanism including:
a first link having a first end pivotally connected to the lower portion of the first conveyor section;
a second link having a first end pivotally connected to the upper portion of the second conveyor section, wherein a second end of the second link is pivotally connected with a second end of the first link; and an actuator configured to pivot the second conveyor section about the first conveyor section by allowing a relative movement between the first link and the second link.

2. The foldable conveyor of claim 1, wherein the pivoting mechanism is laterally positioned and operatively connected to a first side of the first conveyor section and the second conveyor section.

3. The foldable conveyor of claim 1, further comprising another pivoting mechanism laterally positioned and operatively connected to a second side of the first conveyor section and the second conveyor section.

4. The foldable conveyor of claim 1, wherein the second conveyor section is pivotally movable by the actuator to a folded position wherein the second conveyor section is disposed underneath the first conveyor section to attain a folded state.

5. The foldable conveyor of claim 1, wherein the second conveyor section is pivotally movable by the actuator to a linear position with respect to the first conveyor section for attaining a deployed state.

6. The foldable conveyor of claim 1, wherein the actuator is a hydraulic actuator having a hydraulic cylinder pivotally connected to the upper portion of the first conveyor section, and a rod pivotally connected to both of the second end of the first link and the second end of the second link.

7. The foldable conveyor of claim 6, wherein the second end of the first link and the second end of the second link are pivotally connected to the rod of the actuator for defining a common pivot point.

8. A machine comprising:
a frame;
an implement supported on the frame;
a foldable conveyor including:
 a first conveyor section operatively connected to the frame, the first conveyor section having an upper portion, a lower portion and a distal end;
 a second conveyor section pivotally connected to the first conveyor section, the second conveyor section having an upper portion, a lower portion and a distal end, wherein a pivotal connection between the lower portion of the distal end of the first conveyor section and a lower portion of the proximal end of the second conveyor section allows the second conveyor section to articulate about the first conveyor section;
 a pivoting mechanism operatively connected to the first conveyor section and the second conveyor section, the pivoting mechanism including:
  a first link having a first end pivotally connected to the lower portion of the first conveyor section;
  a second link having a first end pivotally connected to the upper portion of the second conveyor section, wherein a second end of the second link is pivotally connected with a second end of the first link; and
  an actuator pivotally connected to the first conveyor section, the actuator also pivotally connected to the second ends of the first and second links, the actuator configured to pivot the second conveyor section about the first conveyor section by allowing a relative movement between the first link and the second link.

9. The machine of claim 8, wherein the pivoting mechanism is laterally positioned and operatively connected to a first side of the first conveyor section and the second conveyor section.

10. The machine of claim 8, further comprising another pivoting mechanism laterally positioned and operatively connected to a second side of the first conveyor section and the second conveyor section.

11. The machine of claim 8, wherein the second conveyor section is pivotally movable by the actuator to a folded position wherein the second conveyor section is disposed underneath the first conveyor section to attain a folded state.

12. The machine of claim 8, wherein the second conveyor section is pivotally movable by the actuator to a linear position with respect to the first conveyor section for attaining a deployed state.

13. The machine of claim 8, wherein the actuator is a hydraulic actuator having a hydraulic cylinder pivotally connected to the upper portion of the first conveyor section.

14. A cold planer machine comprising:
a frame;
a cutting drum supported on the frame;
a plurality of drive tracks adapted to propel the frame;
a plurality of hydraulic legs adapted to raise and lower the cutting drum relative to the drive tracks; and
a foldable conveyor including:
 a first conveyor section operatively connected to the frame, the first conveyor section having an upper portion, a lower portion and a distal end;
 a second conveyor section having an upper portion, a lower portion and a proximal end the lower portion of the proximal end of the second conveyor or section pivotally connected to and forming a pivotal connection with the lower portion of the distal end of the first conveyor section, wherein the pivotal connection allows the second conveyor section to articulate about the first conveyor section; and
 a pivoting mechanism operatively connected to the first conveyor section and the second conveyor section, the pivoting mechanism including:
  a first link having a first end pivotally connected to the lower portion of the distal end of the first conveyor section;
  a second link having a first end pivotally connected to the upper portion of the proximal end of the second conveyor section, wherein a second end of the second link is pivotally connected with a second end of the first link; and
  a hydraulic actuator having a hydraulic cylinder pivotally connected to the first conveyor section and a rod pivotally connected to both of the second end of the first link and the second end of the second link, the hydraulic actuator configured to pivot the second conveyor section about the first conveyor section by allowing a relative movement between the first link and the second link.

\* \* \* \* \*

UNITED STATES PATENT AND TRADEMARK OFFICE
CERTIFICATE OF CORRECTION

PATENT NO. : 8,881,887 B2  
APPLICATION NO. : 13/517761  
DATED : November 11, 2014  
INVENTOR(S) : Jorgensen et al.

Page 1 of 1

It is certified that error appears in the above-identified patent and that said Letters Patent is hereby corrected as shown below:

In the specification

Column 4, line 28, delete "refraction" and insert -- retraction --.

Column 5, line 61, delete "Industrial Applicability" and insert -- INDUSTRIAL APPLICABILITY --.

In the claims

Column 8, lines 34-35, in Claim 14, delete "end the lower portion of the proximal end of the second conveyor or" and insert -- end, the lower portion of the proximal end of the second conveyor --.

Signed and Sealed this
Seventeenth Day of November, 2015

Michelle K. Lee
*Director of the United States Patent and Trademark Office*